United States Patent [19]

Maruyama et al.

[11] Patent Number: 4,855,334

[45] Date of Patent: Aug. 8, 1989

[54] CURABLE RESIN COMPOSITION AND ITS USE

[75] Inventors: Osamu Maruyama, Chiba; Hidenobu Ishikawa, Ichihara; Nobuo Takahashi, Chiba, all of Japan

[73] Assignee: Dainippon Ink and Chemicals, Inc., Tokyo, Japan

[21] Appl. No.: 740,824

[22] Filed: Jun. 3, 1985

Related U.S. Application Data

[63] Continuation-in-part of Ser. No. 517,269, Jul. 26, 1983, abandoned.

[51] Int. Cl.$^4$ .................. C08F 2/50; C08F 226/06; C08F 220/20
[52] U.S. Cl. .................................. 522/96; 522/97; 526/261; 528/73; 544/222
[58] Field of Search .............. 522/96, 97; 544/222; 526/261

[56] References Cited

U.S. PATENT DOCUMENTS

| | | | |
|---|---|---|---|
| 3,637,557 | 1/1972 | Little | 524/101 |
| 3,821,098 | 6/1974 | Garratt et al. | 26/261 |
| 4,128,537 | 12/1978 | Markiewitz | 528/49 |
| 4,485,226 | 11/1984 | Noll | 528/45 |
| 4,526,920 | 7/1985 | Sakashita et al. | 526/261 |
| 4,648,843 | 3/1987 | Mitra | 523/120 |
| 4,650,845 | 3/1987 | Hegel | 526/261 |

FOREIGN PATENT DOCUMENTS

| | | | |
|---|---|---|---|
| 129018 | 8/1983 | Japan | 522/97 |
| 26337 | 3/1984 | Japan . | |

OTHER PUBLICATIONS

Chemical Abstracts 81:154746g (1974), Toray.

*Primary Examiner*—Lewis T. Jacobs
*Assistant Examiner*—Arthur H. Koeckert
*Attorney, Agent, or Firm*—Sherman and Shalloway

[57] ABSTRACT

A curable resin composition comprising an isocyanuric ring-containing urethane-modified radical-polymerizable compound. The composition can give a protective coating having excellent surface mar resistance and improved secondary adhesion.

13 Claims, No Drawings

CURABLE RESIN COMPOSITION AND ITS USE

This application is a continuation-in-part application of U.S. Ser. No. 517,269 filed July 26, 1983, now abandoned.

This invention relates to a novel and useful curable composition. More specifically, this invention relates to a composition which rapidly cures when given a radical source by radiations such as ultraviolet light or electron beams, said composition comprising an isocyanuric ring-containing urethane-modified radical-polymerizable compound which is a reaction product of a specified (meth)acrylate of isocyanuric acid with a polyisocyanate compound, or a reaction product of a specified (meth)acrylate of isocyanuric acid, a polyisocyanate compound and a hydroxyl group-containing radical-polymerizable compound.

It is an object of this invention to provide a composition which can give a protective coating having excellent surface mar resistance and improved secondary adhesion when it is coated on the surfaces of various substrates such as metals, plastics and woods and after optional pre-drying, exposed to ultraviolet rays and ionizing radiations.

Compositions capable of being cured rapidly by radical sources such as ultraviolet light have already been known, and various methods for obtaining cured coated films having excellent hardness, heat resistance and processability by irradiation of ultraviolet light, etc. have been proposed and are gradually gaining commercial acceptance. However, no composition has yet been obtained which can form a cured coated film having high hardness, excellent surface mar resistance, good secondary adhesion (adhesion after testing of water resistance, alkali resistance, solvent resistance, etc.) and good processability. Troubles such as cracking or peeling at processed portions frequently occur when coated substrates are bent or cut. It has been highly desired to remove such troubles.

In view of the state of art described above, the present inventors have made extensive investigations in order to obtain a curable resin composition having satisfactory properties in practical applications, and finally arrived at the present invention.

According to the present invention, there is provided a curable composition comprising an isocyanuric ring-containing urethane-modified radical-polymerizable compound.

In a preferred embodiment, the isocyanuric ring containing urethane-modified radical polymerizable compound is (1) a reaction product between at least one polyisocyanate compound and a di(meth)acrylate of isocyanuric acid represented by the general formula

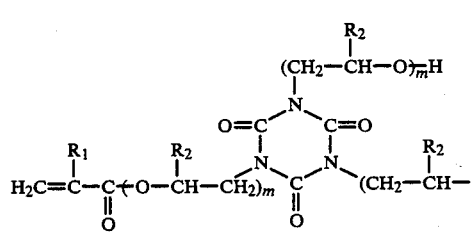

[I-1]

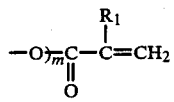

wherein $R_1$ represents a hydrogen atom or a methyl group, $R_2$ represents an alkyl group having 1 to 5 carbon atoms, and m is an integer of from 1 to 20, or (2) a reaction product of at least one polyisocyanate compound, a di(meth)acrylate of isocyanuric acid represented by the general formula

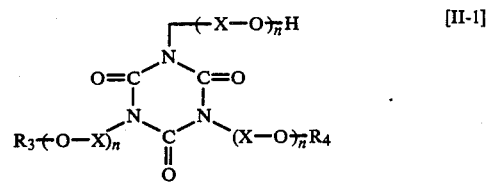

[II-1]

wherein X's are identical or different and each represents an alkylene group having 1 to 5 carbon atoms, or a group resulting from substitution of a hydroxyl group for one hydrogen atom in the alkylene group, $R_3$ and $R_4$ each represent an acryloyl group and/or a methacryloyl group, and n is an integer of 1 to 20, and a hydroxyl group-containing radical-polymerizable compound.

In a more preferred embodiment of this invention, the isocyanuric ring-containing urethane-modified radical-polymerizable compound is (3) a reaction product of at least one polyisocyanate compound with a (meth)acrylate of isocyanuric acid composed mainly of a di(meth)acrylate of isocyanuric acid, namely composed of 40 to 95% by weight of the di(meth)acrylate of isocyanuric acid represented by general formula [I-1] given hereinabove, 2.5 to 30% by weight of a mono(meth)acrylate of isocyanuric acid represented by the general formula

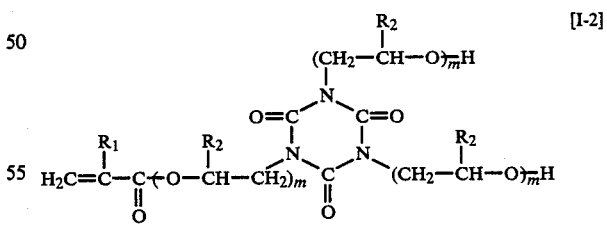

[I-2]

wherein $R_1$, $R_2$ and m are as defined hereinabove, and 2.5 to 30% by weight of a tri(meth)acrylate of isocyanuric acid represented by the general formula

[I-3]

-continued

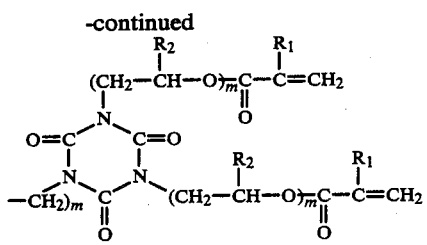

wherein R₁, R₂ and m are as defined above, or (4) a reaction product of at least one polyisocyanate compound with a (meth)acrylate of isocyanuric acid composed mainly of a di(meth)acrylate of isocyanuric acid, namely composed of 40 to 95% by weight of the di(-meth)acrylate of isocyanuric acid represented by general formula [II-1], 2.5 to 30% by weight of a mono(-meth)acrylate of isocyanuric acid represented by the general formula

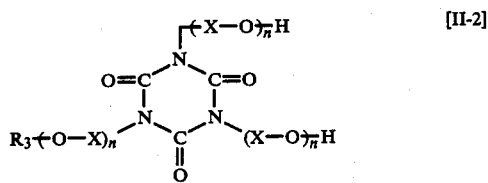

wherein X's, R₃ and n are as defined above, and 2.5 to 30% by weight of a tri(meth)acrylate of isocyanuric acid represented by the general formula

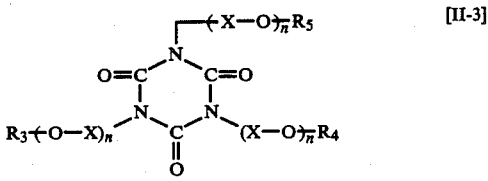

wherein R₃, R₄ and n are as defined, and
R₅ represents an acryloyl group and/or a methacryloyl group,
and a hydroxyl group-containing radical-polymerizable compound.

Such a composition of this invention forms a coated film having excellent processability and high hardness when exposed to irradiation of light or electron beams.

Typical examples of the polyisocyanate compound used herein include aromatic diisocyanates, such as 2,4-tolylene diisocyanate, 2,6-tolylene diisocyanate, 1,4-xylylene diisocyanate, diphenylmethane 4,4'-diisocyanate, 3-methyldiphenylmethane diisocyanate, aliphatic diisocyanates, such as isophorone diisocyanate, hexamethylene diisocyanate, and alicyclic diisocyanates, such as dicyclohexylmethane 4,4'-diisocyanate, dicyclohexylmethane 2,4'-diisocyanate and lysine diisocyanate; hydrogenated diisocyanate compounds obtained by hydrogenating aromatic isocyanates exemplified above (e.g., hydrogenated xylylene diisocyanate or hydrogenated diphenylmethane 4,4'-diisocyanate); trivalent polyisocyanate compounds such as triphenylmethane triisocyanate or dimethylenetriphenyl triisocyanate, and polyisocyanates obtained by polymerizing divalent or trivalent polyisocyanate compounds, for example "Duranate 24A-100 (a product of Asahi Chemical Industry, Co., Ltd.), "Sumidur L-100" (a product of Sumitomo-Bayer Co., Ltd.), "Coronate EH" (a product of Nippon Polyurethane Ind. Co., Ltd.), and "Burnock DN-970" (a product of Dainippon Ink and Chemicals Inc.).

Isocyanate-terminated urethane prepolymers obtained by reacting at least one of the above-mentioned polyisocyanate compounds with a polyol compound having at least two hydroxyl groups per molecule and a number average molecular weight of 62 to 20,000, the equivalent ratio of the hydroxyl groups of the polyol compound to the isocyanate groups of the polyisocyanate compound being 1:1.2–3, can also be used as the polyisocyanate compound in this invention.

Typical examples of the polyol compound are ethylene glycol, 1,2-propylene glycol, diethylene glycol, dipropylene glyc9ol, 1,3-propylene glycol, 1,3-butylene glycol, 1,4-butylene glycol, neopentyl glycol, 1,6-hexanediol, 2,2,4-trimethyl-1,3-pentanediol, dichloroneopentyl glycol, dibromoneopentyl glycol, cyclohexane dimethanol, 1,4-cyclohexanediol, trimethylolethane, trimethylolpropane, glycerol, pentaerythritol, polyethylene glycol, polypropylene glycol, 1,2,6-hexanetriol, hydroxypivalyl hydroxypivalate, bisphenol A, hydrogenated bisphenol A, polyoxytetramethylene glycol and spiroglycol. There can also be cited polyoxyalkylene ether compounds of the above polyol compounds, obtained by addition-reaction of these polyol compounds, such as bisphenol A, with alkylene oxides such as ethylene oxide or propylene oxide. The above polyol compounds also include polyester polyols obtained by esterifying at least one of such polyol compounds with at least one known polybasic acid. Typical examples of the polybasic acid are adipic acid, succinic acid, maleic acid, fumaric acid, sebacic acid, itaconic acid, azelaic acid, 2,2,4-trimethyladipic acid, terephthalic acid, isophthalic acid, ortho-phthalic acid, tetrahydrophthalic acid, hexahydrophthalic acid, citraconic acid, muconic acid, oxalic acid, malonic acid, glutaric acid, trimellitic acid, dimeric acid, and anhydrides of these acids.

These polyester polyols can also be obtained by condensation of the above-exemplified polyol compounds and/or the above-exemplified polybasic acids and epichlorohydrin. For example, polyfunctional epoxy compounds such bisphenol A-type glycidyl ethers, neopentyl glycol, diglycidyl ether, spiroglycol diglycidyl ether, 2,2'-bis(glycidyloxyethoxyphenyl)propane, diglycidyl terephthalate, diglycidyl adipate and diglycidyl dimerate or monofunctional epoxy compounds such as alkyl (e.g., butyl)glycidyl ethers, phenylglycidyl ether, p-t-butylphenylglycidyl ether or glycidyl benzoate can also be used as the polyol component.

Lactone-modified polyester polyols obtained by polycondensing the polyol compounds and/or polyester polyols described above and lactones such as epsiloncaprolactone or gamma-butyrolactone can also be used as the polyol component.

The (meth)acrylates of isocyanuric acid represented by general formulae [I-1], [I-2] and [I-3] can be produced, for example, from isocyanuric acid, alkylene oxides and (meth)acrylic acid or its alkyl ester. The alkylene oxides include ethylene oxide, propylene oxide and butylene oxide. Use of ethylene oxide or propylene oxide is preferred because it gives suitable hardness to a cured coated film. When the degree of polymerization (m) of the alkylene oxide chain exceeds 20, the hardness of the coated film is greatly reduced, and the adhesion of the coated film to various plastic substrates is also markedly reduced.

The isocyanuric ring-containing urethane-modified radical-polymerizable compound can be obtained by first adding the aforesaid alkylene oxide to isocyanuric acid to obtain a tris(polyhydroxyalkylene ether alkyl) isocyanurate, then, either (1) condensing 1 mole of the resulting tris-isocyanurate with about 2 moles of acrylic acid and/or methacrylic acid or (2) ester-interchanging 1 mole of the resulting tris-isocyanaurate with about 2 moles of an alkyl acrylate and/or an alkyl methacrylate, and reacting the resulting mono-, di- and tri-(meth)acrylates of isocyanuric acid by a conventional method, for example, at a temperature of 50° to 100° C. for a period of 2 to 15 hours using a conventional urethanating catalyst such as a tertiary amine or an organic tin compound.

The mono-, di- and tri(meth)acrylates of isocyanuric acid expressed by general formulae [II-1], ]II-2] and [II-3] can be prepared in the same way as above.

The aforesaid isocyanuric ring-containing urethane-modified radical-polymerizable compounds corresponding to the (meth)acrylates of isocyanuric acid represented by general formulae [II-1], [II-2] and [II-3] can be obtained by reacting at least one polyisocyanate compound, the resulting (meth)acrylates of isocyanuric acid and at least one hydroxyl group-containing radical-polymerizable compound in such proportions that 0.05 to 1.00 equivalent of the hydroxyl groups of the (meth-)acrylates and 0.10 to 0.95 equivalent of the hydroxyl groups of the radical-polymerizable compound and 1 equivalent of the polyisocyanate group are used. The desired isocyanuric ring-containing urethane-modified radical-polymerizable compound can be easily obtained by gradually charging the polyisocyanate compound into a mixture of the (meth)acrylate of isocyanuric acid and the hydroxyl group-containing radical-polymerizable compound with a care taken about exotherm, and thereby performing urethanating reaction. Suitably, the charging of the polyisocyanate compound and the subsequent urethanating reaction are carried out at a temperature of 20° to 120° C., preferably 40° to 100° C. To promote the urethanating reaction, there may be used known conventional catalysts such as tertiary amines (e.g., triethylamine or tributylamine) and organic tin compounds (e.g., dibutylin dilaurate or dibutyltin diacetate).

The resulting isocyanuric ring-containing urethane-modified radical-polymerizable compound has a number average molecular weight of from 300 to 10,000.

In this manner, isocyanuric ring-containing urethane-modified radical-polymerizable compounds can be obtained, which correspond to (meth)acrylates of isocyanuric acid containing a di(meth)acrylate of isocyanuric acid as a major component, i.e. composed of 40 to 95% by weight of the di(meth)acrylate of isocyanuric acid of general formula [I-1] or [II-1], 2.5 to 30% by weight of the mono(meth)acrylates of isocyanuric acid of general formula [I-2] or [II-2], and 2.5 to 30% by weight of the tri(meth)acrylate of isocyanuric acid of general formula [I-3] or [II-3].

The composition of this invention comprises the so-obtained isocyanuric ring-containing urethane-modified radical-polymerizable compound as an essential film-forming component. This isocyanuric ring-containing urethane-modified radical-polymerizable compound may account for 0.1 to 100% by weight, preferably 5 to 100% by weight, of the entire film-forming components.

In order to have the objects and advantages of this invention achieved and exhibited to the highest possible degrees and make the composition of this invention more suitable for practical applications, the composition of this invention may further contain at least one of various components (a) to (g) including other film-forming components, reactive diluents, photopolymerization initiators, photpolymerization promoters, thermally decomposable catalyst components, paint additives and solvents.

(a) Prepolymers having at least two radical-polymerizable double bonds per molecule other than the isocyanuric ring-containing urethane-modified radical-polymerizable compounds as the essential component of the composition of this invention (for example, radical-polymerizable compounds such as unsaturated polyesters, poly(meth)acrylates, polyester (meth)acrylates, urethane (meth)acrylates, epoxy(meth)acrylates, silicone (meth)-acrylates and other (meth)acrylate oligomers which are described at pages 404 to 418 of "Synthesis and Application of Photosensitive Resins" published by C.M.C., Co. in 1980). These prepolymers have a number average molecular weight of 100 tO 1,100 and are mono- to hexa-functional.

(b) Compounds generally called reactive diluents. For example, the compounds described at pages 425 to 431 of the above-cited C.M.C. publication; the acrylates and/or methacrylates described at pages 6 to 8 of "Kagaku Kogyo Jiho", No.1753 (published on June 25, 1981); and vinyl compounds such as N-vinylpyrrolidone, vinyl acetate, vinyl propionate, vinyl versatate, styrene and alpha-alkyl-styrenes.

(c) Compounds classified as photopolymerization initiators and photopolymerization promoters, for example the compounds described at page 130 of "Toso Gijutsu", October 1979 or the compounds described at page 49 of "Toso and Toryo", May 1980 (No. 324).

(d) Compounds classified as organic peroxides, for example ketone peroxide, hydroperoxide, dialkyl peroxides, diacyl peroxides and peroxy described in "Organic Peroxides", 3rd edition, a technical bulletin published by Nippon Oils an Fats Co., Ltd.

(e) Diazo compounds such as azobisisobutyronitrile or azobisvaleronitrile.

(f) Various additives used in general paints, etc. Examples are organic and/or inorganic extender pigments, coloring pigments and fillers; adhesion promoters such as silane coupling agents or titanium coupling agents; flow improvers such as levelling agents, thixotropic agents and slipping agents; non-radical-polymerizable modifying resins such as acrylic resins, ketone resins, urethane resins, epoxy resins, alkyd resins, melamine resins and rubbers; polymerization inhibitors; utraviolet absorbers; antistatic agents; and dyeability-imparting agents.

(g) Various organic solvents having a boiling point in the range of 50° to 250° C. under atmospheric pressure.

The composition of this invention can be applied to various substrates including plastics, metals and wooden materials.

For example, it can form a cured coated film having especially superior abrasion resistance and adhesion on various plastic molded articles produced from ABS, AS, polystrene, polycarbonate, various acrylic resins such as poly(methyl methacrylate), polybutylene terephthalate, polyallyl diglycol carbonate, polyvinyl chloride and cellulose acetate.

Plastic molded articles of a high surplus value having a thin metal layer can be produced by coating the composition of this invention, either directly or through a primer coat, on a metallized surface of such plastics or glass on which a thin film of a metal such as aluminum or copper has been deposited by vacuum evaporation, ion plasting, sputtering, etc., and curing the coated film.

The composition of this invention can be applied to other fields than those described above. For example, in the art of wood working, a cured film having excellent abrasion resistance and adhesion can be easily obtained by coating the composition of this invention on a wooden material either directly or through a dried coated layer of a two-package urethane paint, an unsaturated polyester paint, etc. which has been formed on the surface of the wooden material.

By exposing the composition of this invention to either an ionizing radiation such as ultraviolet rays or electron beams, a protective film having excellent mar resistance and much improved secondary adhesion can be formed.

Accordingly, the composition of this invention can be applied to household appliances made of the aforesaid various plastics (various containers, toys, etc.), optical devices (lenses for sunglasses, lenses for eyeglasses, lenses for cameras, lenses for telescopes, magnifying glasses, microscopes), stationery (rulers, pencil cases, etc.), automotive parts (windowpanes, various display parts, headlights, tail lamps, etc.), aircraft windowpanes, and ship's windowpanes or displays; display parts of electrical appliances; various plastics or glass molded articles having a thin metal layer (various caps, buttons, containers, etc.); wooden products such as furniture and articles of folk craft; and glass containers for beverages, seasonings, wines and liquors, and cosmetics).

Since the cured coated film obtained from the composition of this invention has very good weather-ability, it is also suitable for coating building materials, for example for coating roof tiles, slates and floor tiles for surface protection or aesthetic beauty.

Since the composition of this invention cures rapidly when exposed to energy rays, for example ultraviolet light or ionizing radiations, it can give a cured coated film having from flexibility to high hardness and excellent processability; furthermore, troubles of cracking or peeling at processed parts do not occur even when substrates coated with the composition of this invention are bent or cut.

The composition of this invention can be coated on articles of the various thermoplastic resins stated above, articles of various thermosetting resins such as epoxy resins, phenolic resins and unsaturated polyester resins, and metallic articles coated with thermoplastic or thermosetting organic paints, by conventional coating methods such as bar coater coating, roll coating or spray coating.

The following examples specifically illustrate the present invention without any intention of limiting the invention thereby.

Unless otherwise specified, all parts and percentages in these examples are by weight.

REFERENTIAL EXAMPLE 1

Preparation of an isocyanuric ring-containing urethane-modified radical-polymerizable compound:

A four-necked flask equipped with a stirrer and a thermometer was charged with 369 parts of di(acryloxyethyl)monohydroxyethyl isocyanurate and 0.5 part of hydroquinone, and at 60° to 70° C., 84 parts of hexamethylene diisocyanate was gradually added. Furthermore, 0.1 part of triethylamine was added as a urethanating catalyst. The reaction was continued at 80° C. for 10 hours to give a viscous compound having an isocyanate group content of 0.05%. The resulting compound is designated as compound A.

REFERENTIAL EXAMPLE 2

Preparation of an isocyanuric ring-containing urethane-modified radical-polymerizable compound:

The same flask as used in Referential Example 1 was charged with 369 parts of diacryloxyethylmonohydroxyethyl isocyanurate and 0.7 part of hydroquinone, and at 60° to 70° C., 338.7 parts of "Burnock DN-950" (a polyisocyanate produced by Dainippon Ink and Chemicals, Inc.; isocyanate group content 12.4%) was gradually added. Furthermore, 0.15 part of triethylamine as a urethanating catalyst was added, and the reaction was continued at 80° C. for 10 hours to obtain a viscous compound having an isocyanate group content of 0.03%. This compound is designated as compound B.

REFERENTIAL EXAMPLE 3

Preparation of an isocyanuric ring-containing urethane-modified radical-polymerizable compound:

The same flask as used in Referential Example 1 was charged with 350.6 parts of "Burnock DN-161" (a polyester polyol produced byy Dainippon Ink and Chemicals, Inc.; hydroxyl value 160), and 174 parts of 2,4-tolylene diisocyanate was added dropwise at 30° to 35° C. After the addition, the temperature was raised to 80° C. with a care taken about exotherm, and 0.1 part of triethylamine as a urethanating catalyst was added. The reaction was continued for 3 hours. When the isocyanate group content of the reaction mixture reached 8.0%, 369 parts of diacryloxyethylmonohydroxyethyl isocyanurate was fed, and the reaction was carried out at 80° C. for 10 hours to give a compound having an isocyanate group content of 0.03% which was semisolid at room temperature. This compound was designated as compound C.

REFERENTIAL EXAMPLE 4

Preparation of an isocyanuric ring-containing urethane-modified radical-polymerizable compound:

A viscous compound having an isocyanate group content of 0.05% was produced in the same way as in Referential Example 1 except that 397 parts of dimethacryloxyethylmonohydroxy isocyanurate was used instead of the diacryloxyethylmonohydroxyethyl isocyanurate. The resulting compound was designated as compound D.

REFERENTIAL EXAMPLE 5

Preparation of a radical-curable compound for comparison:

A compound having an isocyanate group content of 0.04% was produced in the same way as in Referential Example 1 except that 242 parts of trimethylolpropane diacrylate was used instead of the diacryloxyethylmonohydroxyethyl isocyanurate. The resulting compound was designated as compound A'.

REFERENTIAL EXAMPLE 6

Preparation of a radical-cured compound for comparison:

A compound having an isocyanate group content of 0.05% was produced in the same way as in Referential Example 1 except that 284 parts of pentaerythritol triacrylate was used instead of the diacryloxyethyl-monohydroxyethyl isocyanurate. The resulting compound was designated as compound A".

REFERENTIAL EXAMPLE 7

Preparation of a radical-curable compound for comparison:

A compound having an isocyanate group content of 0.05% was produced in the same way as in Referential Example 2 except that 242 parts of trimethylolpropane diacrylate was used instead of the diacryloxyethyl-monohydroxyethyl isocyanurate. The resulting compound was designated as compound B'.

REFERENTIAL EXAMPLE 8

Preparation of a radical-curable compound for comparison:

A compound having an isocyanate group content of 0.03% was produced in the same way as in Referential Example 3 except that 242 parts of trimethylolpropane diacrylate was used instead of the diacryloxyethyl-monohydroxyethyl isocyanurate. The resulting compound was designated as compound C'.

EXAMPLE 1

Fifty parts of compound A, 50 parts of neopentyl glycol diacrylate and 2 parts of "Irgacure 184" (a tradename for a product of Ciba-Geigy Company of West Germany) as a photopolymerization initiator were mixed to form a curable resin composition.

The composition was coated on a plate of ABS resin by means of a No. 5 bar coater, and exposed to light from a 80 W/cm medium-pressure mercury lamp for 3 seconds. The resulting coated film had a high hardness expressed by a pencil hardness (measured by using a "Mitsubishi UNI" pencil) of 6H.

When the coated ABS plate was cut by a household saw, no peeling or edge defect was observed at the cut surface of the coated film.

EXAMPLE 2

Fifty parts of compound D, 50 parts of neopentyl glycol diacrylate and 2 parts of "Irgacure 184" were mixed to form a curable resin composition.

The resin composition was coated on a plate of ABS resin by meansof a No. 5 bar coater, and exposed to light from a 80 W/cm medium-pressure mercury lamp for 10 seconds. A film having a high hardness expressed by a pencil hardness of 6H was obtained.

When the coated plate was cut by a saw or a cutter knife, no phenomenon of peeling or edge defect was observed at the cut surface.

COMPARATIVE EXAMPLE 1

A coated film was formed by repeating the same procedure as in Example 1 except that the same amount of compound A' was used instead of compound A.

The film had a pencil hardness of 4H, and when it was cut by a saw, peeling and edge defect to a width of 1 to 1.5 mm were observed at the cut portion.

COMPARATIVE EXAMPLE 2

A coated film was formed by repeating the same procedure as in Example 1 except that the same amount of compound A" was used instead of compound A.

The film had a pencil hardness of 5H, and when it was cut by a saw, peeling and edge defects to a width of 2 to 3 mm was observed at the cut portion.

EXAMPLE 3

A coated film was formed by repeating the same procedure as in Example 1 except that the same amount of compound B was used instead of compound A and the coating substrate was changed to a plate of hard polyvinyl chloride.

The film had a pencil hardness of 7H or higher, and when it was cut by a saw and a cutter knife, no peeling or edge defect was observed at the cut portion and the crosscut portion.

COMPARATIVE EXAMPLE 3

A coated film was formed by repeating the same procedure as in Example 3 except that the same amount of compound B' was used instead of compound B.

The film had a pencil hardness of 5H. When a crosscut was provided in the film by a cutter knife, peeling to a width of about 2 mm (the state in which the film was raised) was observed. When it was cut by a saw, peeling and edge defect to a width of 3 to 5 mm were observed.

EXAMPLE 4

A coated film was formed by repeating the same procedure as in Example 1 except that the same amount of compound C was used instead of compound A, and the coating substrate was changed to a plate of AS resin.

The film had a pencil hardness of 4H, and when it was cut by a saw or a crosscut was formed on it, no peeling or edge defect was observed.

COMPARATIVE EXAMPLE 4

A coated film was formed by repeating the same procedure as in Example 4 except that the same amount of compound C' was used instead of compound C.

The film had a pencil hardness of 3H. When a crosscut was formed on the film, peeling and edge defect to a width of 2 mm were observed. When it was cut by a saw, peeling and edge defect to a width of 2 to 4 mm were observed.

EXAMPLE 5

A coated film was formed in the same way as in Example 1 except that the "Irgacure 184" was not used, and electron beams in a dose of 3 megarads were used as the source of radiation.

The resulting film had a pencil hardness of 6H, and when the film was cut by a saw or a crosscut was formed on it by a knife cutter, no peeling or edge defect was observed.

COMPARATIVE EXAMPLE 5

A coated film was formed in the same way as in Example 5 except that the coating prepared in Comparative Example 2 without using "Irgacure 184" was used.

The resulting coated film had a pencil hardness of 5H. When a crosscut was formed on the film, peeling and edge defect to a width of 2 mm were observed. When it was cut by a saw, peeling and edge defect to a width of 3 to 5 mm were observed.

REFERENTIAL EXAMPLE 9

Preparation of an isocyanuric ring-containing urethane-modified radical-polymerizable compound:

A flask equipped with a stirrer, a thermometer and a condenser was charged with 369 parts of acrylates of trishydroxyethyl isocyanurate (to be abbreviated as THEIC); consisting of 5% of a monoacrylate, 90% of a diacrylate and 5% of a triacrylate, 116 parts of 2-hydroxyethyl acrylate (to be abbreviated as HEA), 0.5 part of hydroquinone monomethyl ether (to be abbreviated as MEHQ) and 0.2 part of triethylamine. The mixture was heated to 80° C. in a stream of nitrogen. Then, 174 parts of 2,4-tolylene diisocyanate (TDI for short) was added dropwise over the course of 1 hour. The reaction was continued at the same temperature for 5 hours to give the desired compound having an isocyanate group content of zero percent. The resulting compound was designated as compound E.

REFERENTIAL EXAMPLE 10

Preparation of an isocyanuric ring-containing urethane-modified radical-polymerizable compound:

The desired compound having an isocyanate group content of zero percent was produced in the same way as in Referential Example 9 except that the same amount of 2-hydroxypropyl acrylate (to be abbreviated as HPA) was used instead of HEA, 168 parts of hexamethylene diisocyanate (HMDI for short) was used instead of TDI, and the reaction time after the dropwise addition of HMDI was adjusted to 8 hours. The resulting compound was designated as compound F.

REFERENTIAL EXAMPLE 11

Preparation of an isocyanuric ring-containing urethane-modified radical-polymerizable compound:

The same flask was used in Referential Example 9 was charged with 369 parts of acrylates of THEIC (consisting of 5% of w monoacrylate, 90% of a diacrylate and 5% of a triacrylate), 70 parts of HEA, 65 parts of HPA, 0.7 part of MEHQ and 0.2 part of triethylamine, and the mixture was heated to 70° C. Then, 362 parts of "Duranate 24A-100" (having an isocyanate group content of 23.2%) was added over the course of 1 hour, and the reaction was continued at 80° C. for 5 hours to give the desired compound having an isocyanate group content of zero percent. The resulting compound was designated as compound G.

REFERENTIAL EXAMPLE 12

Preparation of an isocyanuric ring-containing urethane-modified radical-polymerizable compound:

The same flask as used in Referential Example 9 was charged with 151 parts of "Nissan Epiol P" (phenyl glycidyl ether made by Nippon Oils and Fats Co., Ltd.; epoxy equivalent 151), 72 parts of acrylic acid, 0.5 part of MEHQ and 0.5 part of triethylamine. The mixture was reacted at 90° to 95° C. for 11 hours to give an ester compound having an acyl value (mg KOH/g) of 0.5.

Then, 390 parts of acrylates of THEIC (consisting of 5% of a monoacrylate, 90% of a diacrylate and 5% of a triacrylate) was added, and the temperature was adjusted to 80° C. TDI (174 parts) was added over the course of 1 hour, and at this temperature, the reaction was continued for 5 hours to give the desired compound having an isocyanate group content of zero percent. The resulting compound was designated as compound H.

REFERENTIAL EXAMPLE 13

Preparation of an isocyanuric ring-containing urethane-modified radical-polymerizable compound:

The desired compound having an isocyanate group content of zero percent was produced by repeating the same procedure as in Referential Example 9 except that the same amount of acrylates of THEIC (consisting of 25% of a monoacrylate, 50% of a diacrylate and 25% of a triacrylate) was used instead of the acrylates of THEIC composed of 5% of a monoacrylate, 90% of a diacrylate and 5% of a triacrylate. The resulting compound was designated as compound I.

REFERENTIAL EXAMPLE 14

Preparation of an isocyanuric ring-containing urethane-modified radical-polymerizable compound:

The desired compound having an isocyanate group content of zero percent was produced by repeating the same procedure as in Referential Example 9 except that 397 parts of methacrylate of THEIC composed of 25% of a monomethacrylate, 50% of a dimethacrylate and 25% of a trimethacrylate was used instead of the acrylates of THEIC consisting of 5% of a monoacrylate, 90% of a diacrylate and 5% of a triacrylate. The resulting compound was designated as compound J.

REFERENTIAL EXAMPLE 15

Preparation of a radical-curable compound for comparison:

The desired compound having an isocyanate group content of zero percent was produced in the same way as in Referential Example 10 except that 242 parts of trimethylolpropane diacrylate obtained by esterifying 1 mole of trimethylolpropane and 2 moles of acrylic acid was used instead of the acrylates of THEIC, the amount of HPA was changed to 130 parts, and the reaction time after addition of HMDI was changed to 7 hours. The resulting compound was designated as compound F'.

REFERENTIAL EXAMPLE 16

Preparation of a radical-curable compound for comparison:

The same flask as used in Referential Example 9 was charged with 400 parts of glycerol diacrylate, 0.5 part of MEHQ and 0.2 part of triethylamine, and the mixture was heated to 80° C. Then, 188 parts of xylylene diisocyanate was added over the course of 1 hour, and the reaction was continued for 6 hours at the same temperature to form the desired compound having an isocyanate group content of zero percent. The resulting compound was designated as compound K'.

EXAMPLES 6 TO 31 AND COMPARATIVE EXAMPLES 6 TO 24

Compositions of this invention and compositions for comparison were prepared by uniformly mixing the components shown in Tables 2 to 5 in the proportions indicated therein.

The resulting compositions were spray-coated on the various plastic substrates to be described hereinafter, pre-dried for 6 minutes in a hot air drying oven at 60° C., and then moved on a conveyor located 15 cm below an ozone-type high-pressure mercury lamp (output 80 W/cm; manufactured by Iwasaki Electric Co., Ltd.) at a conveyor speed of 2 m/min. once (three times in Example 11, 17, 23 and 31) to expose the films to ultraviolet irradiation.

The cured films were each tested for the following properties.

(1) Initial Adhesion

On the cured film on each substrate, eleven cuts having a width of 1 mm were formed longitudinally and transversely by a knife cutter so that they crossed each other at right angles (100 squares each having an area of one mm² were formed). A cellophane type was applied to the entire crosscut surface. The tape was then peeled off vigorously, and the number of squares which remained unpeeled was counted and defined as a measure of initial adhesion.

(2) Secondary Adhesion After A Water Resistance Test

The coated sample was immersed in deionized water at 40° C. for 24 hours, and then the adhesion of the coated film was evaluated in the same way as in (1) above.

(3) Secondary Adhesion After A Moisture Resistance Test

The coated sample was exposed to humid air for 24 hours in a humidity box of more than 98% at 50° C., and the adhesion of the coated film was evaluated in the same way as in (1) above.

(4) Secondary Adhesion After An Acid Resistance Test

The coated sample was immersed in a 5% aqueous solution of sulfuric acid at 20° C. for 24 hours, and then the adhesion of the coated film was evaluated in the same way as in (1) above.

(5) Secondary Adhesion After An Alkali Resistance Test

The coated sample was immersed in a 5% aqueous solution of sodium hydroxide at 20° C. for 24 hours, and then the adhesion of the coated film was evaluated in the same way as in (1) above.

(6) Secondary Adhesion After An Alcohol Resistance Test

The coated sample was immersed in a 100% ethanol at 20° C. for 24 hours, and then the adhesion of the coated film was evaluated in the same way as in (1) above.

(7) Steel Wool Abrasion Resistance

The steel wool resistance of the coated sample was examined by using steel wool (#000), and evaluated on a scale of the following three grades.

Excellent: no scratch was caused even when the sample was rubbed strongly with the steel wool.

Good: no scratch was caused when the sample was rubbed lightly with the steel wool.

Poor: a scratch was caused even when the sample was lightly rubbed with the steel wool.

The results of these tests are summarized in Tables 2 to 5.

The compositions of this invention and the compositions for comparison which were obtained in Examples 1 to 5 and Comparative Examples 1 to 5, respectively, were coated in the same way as in Examples 6 to 31 and Comparative Examples 6 to 24, respectively. The properties of the resulting cured films were tested, and the results are summarized in Table 1.

In the examples shown in Tables 2 and 3, an ABS resin and a polycarbonate resin were used as substrates. In the examples shown in Tables 4 and 5, poly(methylmethacrylate) (PMMA resin for short) was used as substrates. The examples given in Table 4 differ from those given in Table 5 in respect of the presence of dipentaerythritol hexaacrylate (DPHA for short).

TABLE 1

|  |  | Example |  |  |  |  | Comparative Example |  |  |  |  |
|---|---|---|---|---|---|---|---|---|---|---|---|
|  |  | 1 | 2 | 3 | 4 | 5 | 1 | 2 | 3 | 4 | 5 |
| Mixing proportions |  |  |  |  |  |  |  |  |  |  |  |
| Isocyanuric ring-containing urethane-modified radical-polymerizable compound | Designation Amount (parts) | A | D | B 50 | C | A | A' | A" | B' 50 | C' | A" |
| Neopentyl glycol diacrylate |  |  |  | 50 |  |  |  |  | 50 |  |  |
| Irgacure 184 |  | 2 | 2 | 2 | 2 | 2 | 2 | 2 | 2 | 2 |  |
| Film thickness (μm) |  | 7 | 8 | 8 | 7 | 8 | 8 | 8 | 7 | 8 | 7 |
| Properties of the cured film |  |  |  |  |  |  |  |  |  |  |  |
| Initial adhesion |  |  |  | 100 |  |  | 48 | 46 | 38 | 35 | 47 |
| Secondary adhesion after a water resistance test |  |  |  | 100 |  |  |  |  | 0 |  |  |
| Secondary adhesion after a moisture resistance test |  |  |  | 100 |  |  |  |  | 0 |  |  |
| Secondary adhesion after an acid resistance test |  |  |  | 100 |  |  | 8 | 9 | 7 | 5 | 10 |
| Secondary adhesion after an alkali resistance test |  |  |  | 100 |  |  | 19 | 20 | 17 | 8 | 24 |
| Secondary adhesion after an alcohol resistance test |  |  |  | 100 |  |  | 6 | 5 | 5 | 3 | 8 |
| Steel wool abrasion resistance |  |  |  | Good |  |  |  |  | Good |  |  |

TABLE 2

|  |  | Example |  |  |  |  |  | Comparative Example |  |  |  |  |
|---|---|---|---|---|---|---|---|---|---|---|---|---|
|  |  | 6 | 7 | 8 | 9 | 10 | 11 | 6 | 7 | 8 | 9 | 10 |
| Mixing proportions |  |  |  |  |  |  |  |  |  |  |  |  |
| Isocyanuric ring-containing urethane-modified radical-polymerizable compound | Designation Amount (parts) | E | F | G 50 | H | I | J | F' 50 | F' 25 | K' 50 | K' 25 | F' 25 |
| Acryrate of THEIC (*) |  |  |  |  |  |  |  |  | 25 |  | 25 |  |
| Methacrylate of THEIC (**) |  |  |  |  |  |  |  |  |  |  |  | 25 |

TABLE 2-continued

|  | Example | | | | | | Comparative Example | | | | |
|---|---|---|---|---|---|---|---|---|---|---|---|
|  | 6 | 7 | 8 | 9 | 10 | 11 | 6 | 7 | 8 | 9 | 10 |
| Benzoyl isobutyl ether |  |  | 1 |  |  |  |  |  | 1 |  |  |
| Toluene |  |  | 50 |  |  |  |  |  | 50 |  |  |
| n-Butanol |  |  | 50 |  |  |  |  |  | 50 |  |  |
| Film thickness (μm) | 11 | 9 | 12 | 10 | 9 | 11 | 10 | 11 | 12 | 11 | 11 |
| Properties of the cured film |  |  |  |  |  |  |  |  |  |  |  |
| Initial adhesion |  |  | 100 |  |  |  |  |  | 100 |  |  |
| Secondary adhesion after a water resistance test |  |  | 100 |  |  |  | 51 | 48 | 38 | 46 | 43 |
| Secondary adhesion after a moisture resistance test |  |  | 100 |  |  |  | 42 | 43 | 25 | 37 | 40 |
| Secondary adhesion after an acid resistance test |  |  | 100 |  |  |  | 75 | 71 | 41 | 55 | 68 |
| Secondary adhesion after an alkali resistance test |  |  | 100 |  |  |  | 80 | 69 | 42 | 61 | 59 |
| Secondary adhesion after an alcohol resistance test |  |  | 100 |  |  |  | 47 | 44 | 28 | 36 | 47 |
| Steel wool abrasion resistance |  |  | Good |  |  |  |  |  | Good |  |  |

(*) Composed of 5% of a monoacrylate, 90% of a diacrylate and 5% of a triacrylate.
(**) Composed of 25% of a monomethacrylate, 50% of a dimethacrylate and 25% of a trimethacrylate

TABLE 3

|  |  | Example | | | | | | Comparative Example | | | | |
|---|---|---|---|---|---|---|---|---|---|---|---|---|
|  |  | 12 | 13 | 14 | 15 | 16 | 17 | 11 | 12 | 13 | 14 | 15 |
| Mixing proportions |  |  |  |  |  |  |  |  |  |  |  |  |
| Isocyanuric ring-containing urethane-modified radical-polymerizable compound | Designation | E | F | G | H | I | J | F' | F' | K' | K' | F' |
|  | Amount (parts) |  |  | 50 |  |  |  | 50 | 25 | 50 | 25 | 25 |
| Acrylate of THEIC (*) |  |  |  |  |  |  |  |  | 25 |  | 25 |  |
| Methacrylate of THEIC (**) |  |  |  |  |  |  |  |  |  |  |  | 25 |
| Benzoyl isobutyl ether |  |  |  | 1 |  |  |  |  |  | 1 |  |  |
| Toluene |  |  |  | 50 |  |  |  |  |  | 50 |  |  |
| n-Butanol |  |  |  | 50 |  |  |  |  |  | 50 |  |  |
| Film thickness (μm) |  | 10 | 9 | 11 | 12 | 11 | 10 | 11 | 10 | 9 | 11 | 11 |
| Properties of the cured film |  |  |  |  |  |  |  |  |  |  |  |  |
| Initial adhesion |  |  |  | 100 |  |  |  | 86 | 94 | 74 | 81 | 85 |
| Secondary adhesion after a water resistance test |  |  |  | 100 |  |  |  | 37 | 38 | 31 | 26 | 33 |
| Secondary adhesion after a moisture resistance test |  |  |  | 100 |  |  |  | 35 | 38 | 27 | 25 | 29 |
| Secondary adhesion after an acid resistance test |  |  |  | 100 |  |  |  | 54 | 49 | 58 | 41 | 45 |
| Secondary adhesion after an alkali resistance test |  |  |  | 100 |  |  |  | 58 | 63 | 57 | 39 | 48 |
| Secondary adhesion after an alcohol resistance test |  |  |  | 100 |  |  |  | 33 | 30 | 25 | 28 | 31 |
| Steel wool abrasion resistance |  |  |  | Good |  |  |  |  |  | Good |  |  |

(*) & (**): Same as the footnote to Table 2.

TABLE 4

|  |  | Example | | | | | | Comparative Example | | | | |
|---|---|---|---|---|---|---|---|---|---|---|---|---|
|  |  | 18 | 19 | 20 | 21 | 22 | 23 | 16 | 17 | 18 | 19 | 20 |
| Mixing proportions |  |  |  |  |  |  |  |  |  |  |  |  |
| Isocyanuric ring-containing urethane-modified radical-polymerizable compound | Designation | E | F | G | H | I | J | F' | F' | K' | K' | F' |
|  | Amount (parts) |  |  | 50 |  |  |  | 50 | 25 | 50 | 25 | 25 |
| Acryrate of THEIC (*) |  |  |  |  |  |  |  |  | 25 |  | 25 |  |
| Methacrylate of THEIC (**) |  |  |  |  |  |  |  |  |  |  |  | 25 |
| Benzoyl isobutyl ether |  |  |  | 1 |  |  |  |  |  | 1 |  |  |
| Toluene |  |  |  | 50 |  |  |  |  |  | 50 |  |  |
| n-Butanol |  |  |  | 50 |  |  |  |  |  | 50 |  |  |
| Film thickness (μm) |  | 12 | 9 | 11 | 10 | 12 | 9 | 10 | 11 | 10 | 9 | 9 |
| Properties of the cured film |  |  |  |  |  |  |  |  |  |  |  |  |
| Initial adhesion |  |  |  | 100 |  |  |  | 40 | 34 | 41 | 37 | 37 |
| Secondary adhesion after a water resistance test |  |  |  | 100 |  |  |  | 3 | 5 | 2 | 7 | 5 |
| Secondary adhesion after a moisture resistance test |  |  |  | 100 |  |  |  | 4 | 0 | 3 | 6 | 2 |
| Secondary adhesion after an acid resistance test |  |  |  | 100 |  |  |  | 13 | 15 | 17 | 11 | 11 |
| Secondary adhesion after an alkali resistance test |  |  |  | 100 |  |  |  | 18 | 20 | 16 | 15 | 14 |
| Secondary adhesion after an alcohol resistance test |  |  |  | 100 |  |  |  | 6 | 3 | 5 | 5 | 3 |
| Steel wool abrasion resistance |  |  |  | Good |  |  |  |  |  | Good |  |  |

(*) & (**): Same as the footnote to Table 2.

TABLE 5

|  |  | Example | | | | | | | |
|---|---|---|---|---|---|---|---|---|---|
|  |  | 24 | 25 | 26 | 27 | 28 | 29 | 30 | 31 |
| Mixing proportions |  |  |  |  |  |  |  |  |  |
| Isocyanuric ring-containing urethane-modified radical- | Designation | E | E | E | G | G | G | I | J |
|  | Amount (parts) | 30 | 20 | 10 | 30 | 20 | 10 | 20 | 20 |

TABLE 5-continued

| polymerizable compound | | | | | | | | |
|---|---|---|---|---|---|---|---|---|
| Acrylate of THEIC (*) | 10 | 15 | 20 | 10 | 15 | 20 | 15 | |
| Methacrylate of THEIC (**) | | | | | | | | 15 |
| DPHA (***) | 10 | 15 | 20 | 10 | 15 | 20 | 15 | 15 |
| Benzoyl isobutyl ether | | | | 1 | | | | |
| Toluene | | | | 50 | | | | |
| n-Butanol | | | | 50 | | | | |
| Film thickness (μm) | 9 | 10 | 11 | 11 | 10 | 12 | 10 | 9 |
| Properties of the cured film | | | | | | | | |
| Initial adhesion | | | | 100 | | | | |
| Secondary adhesion after a water resistance test | | | | 100 | | | | |
| Secondary adhesion after a moisture resistance test | | | | 100 | | | | |
| Secondary adhesion after an acid resistance test | | | | 100 | | | | |
| Secondary adhesion after an alkali resistance test | | | | 100 | | | | |
| Secondary adhesion after an alcohol resistance test | | | | 100 | | | | |
| Steel wool abrasion resistance | Good | Good | Excellent | Good | Excellent | Excellent | Excellent | Excellent |

| | | Comparative Example | | | |
|---|---|---|---|---|---|
| | | 21 | 22 | 23 | 24 |
| Mixing proportions | | | | | |
| Isocyanuric ring-containing urethane-modified radical-polymerizable compound | Designation<br>Amount (parts) | F'<br>30 | F'<br>20 | F'<br>10 | F'<br>10 |
| Acrylate of THEIC (*) | | 10 | 15 | 20 | |
| Methacrylate of THEIC (**) | | | | | 20 |
| DPHA (***) | | 10 | 15 | 20 | 20 |
| Benzoyl isobutyl ether | | | 1 | | |
| Toluene | | | 50 | | |
| n-Butanol | | | 50 | | |
| Film thickness (μm) | | 10 | 11 | 10 | 10 |
| Properties of the cured film | | | | | |
| Initial adhesion | | 17 | 9 | 3 | 4 |
| Secondary adhesion after a water resistance test | | | 0 | | |
| Secondary adhesion after a moisture resistance test | | | 0 | | |
| Secondary adhesion after an acid resistance test | | 8 | 2 | 0 | 0 |
| Secondary adhesion after an alkali resistance test | | 7 | 2 | 0 | 0 |
| Secondary adhesion after an alcohol resistance test | | | 0 | | |
| Steel wool abrasion resistance | | Good | Good | Excellent | Excellent |

(*) & (**): Same as the footnote to Table 2.
(***): Dipentaerythritol hexaacrylate

What is claimed is:

1. A radiation curable resin composition comprising an isocyanuric ring-containing uretahen modified radical polymerizable compound selected from the group consisting of
   (A) a reaction product of at least one polyisocyanate compound with a di(meth)acrylate of isocyanuric acid represented by the following general formula

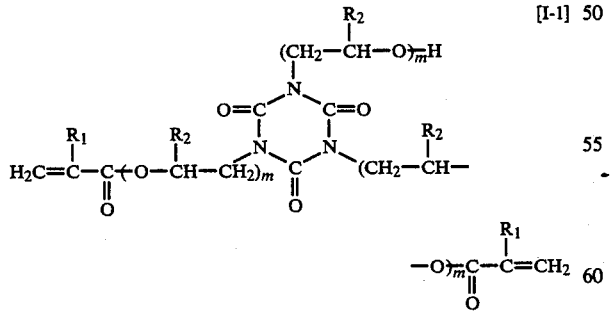

[I-1]

wherein R₁ represents a hydrogen atom or a methyl group, R₂ represents an alkyl group having 1 to 5 carbon atoms, and m is an integer of 1 to 20; and
   (B) a reaction product of at least one polyisocyanate compound, a di(meth)acrylate of isocyanuric acid represented by the following general formula

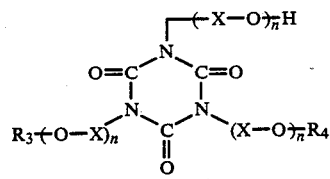

[II-1]

wherein X's are identical or different and each represents an alkylene group or a group resulting from substitution of a hydroxyl group for one hydrogen atom in the alkylene group, R₃ and R₄ each represent an acryloyl group and/or a methacryloyl group, and n is an integer of 1 to 20, and 2-hydroxxyethylacrylate, 2-hydroxypropyl acrylate or a mixture thereof as a hydroxyl group-containing radical-polymerizable compound.

2. The composition of claim 1 wherein the isocyanuric ring-containing urethane-modified radical-polymerizable compound is said reaction product of at least one polyisocyanate compound with a di(meth)acrylate of isocyanuric acid represented by the following general formula

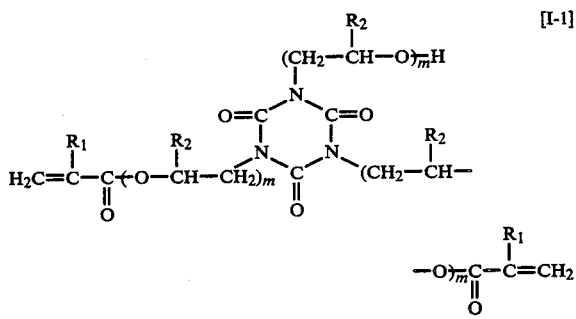

wherein $R_1$ represents a hydrogen atom or a methyl group, $R_2$ represents an alkyl group having 1 to 5 carbon atoms, and m is an integer of 1 to 20.

3. The composition of claim 1 wherein the isocyanuric ring-containing urethane-modified radical-polymerizable compound is said reaction product of at least one polyisocyanate compound, a di(meth)acrylate of isocyanuric acid represented by the following general formula

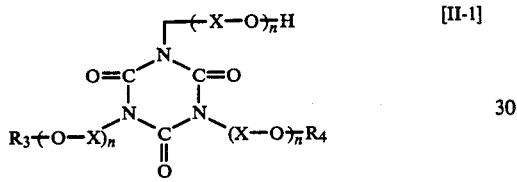

wherein X's are identical or different and each represents an alkylene group or a group resulting from substitution of a hydroxyl group for one hydrogen atom in the alkylene group, $R_3$ and $R_4$ each represent an acrylol group and/or a methacryloyl group, and n is an integer of 1 to 20, and 2-hydroxyethyl acrylate, 2-hydroxypropyl acrylate or a mixture thereof, as a hydroxyl group-containing radical-polymerizable compound.

4. The composition of claim 2 wherein the isocyanuric ring-containing urethane-modified radical-polymerizable compound is a reaction product of at least one polyisocyanate compound, and a (meth)acrylate of isocyanuric acid composed of 40 to 95% by weight of a di(meth)acrylate of isocyanuric acid represented by the following general formula

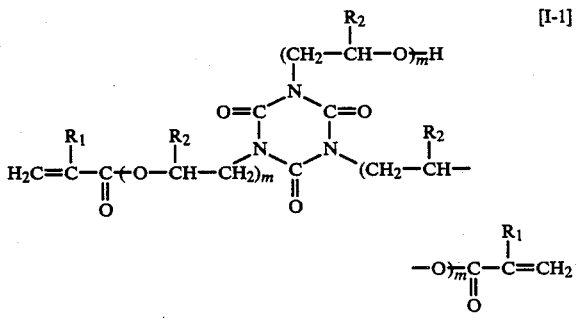

wherein $R_1$ represents a hydrogen atom or a methyl group, $R_2$ represents an alkyl group having 1 to 5 carbon atoms, and m is an integer of 1 to 20, 2.5 to 30% by weight of a mono(meth)acrylate of isocyanuric acid represented by the general formula

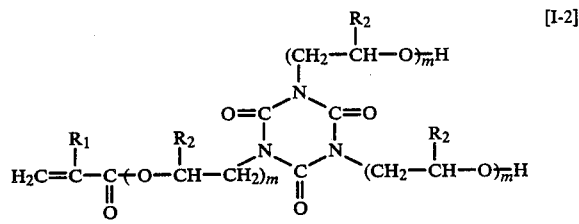

wherein $R_1$ represents a hydrogen atom or a methyl group, $R_2$ represents an alkyl group having 1 to 5 carbon atoms, and m is an integer of 1 to 20, and 2.5 to 30% by weight of a tri(meth)acrylate of isocyanuric acid represented by the general formula

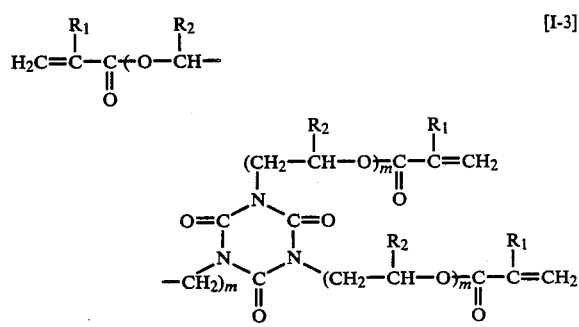

wherein $R_1$ represents a hydrogen atom or a methyl group, $R_2$ represents an alkyl group having 1 to 5 carbon atoms, and m is an integer of 1 to 20.

5. The composition of claim 3 wherein the isocyanuric ring-containing urethane-modified radical-polymerizable compound is a reaction of at least one polyisocyanate compound, and a (meth)acrylate of isocyanuric acid composed of 40 to 90% by weight of a di(meth)acrylate of isocyanuric acid represented by the following general formula

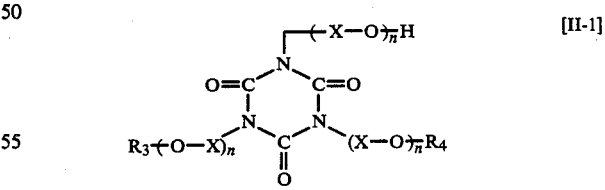

wherein X's are identical or different and each represents an alkylene group having 1 to 5 carbon atoms or a group resulting from substitution of a hydroxyl group for one hydrogen atom in the alkylene group, $R_3$ and $R_4$ each represent an acryloyl group and/or a methacryloyl group, and n is an integer of 1 to 20, 2.5 to 30% by weight of a mono(meth)acrylate of isocyanuric acid represented by the general formula

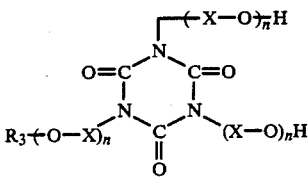

(II-2)

wherein X's, $R_3$ and n are as defined above, and 2.5 to 30% by weight of a tri(meth)acrylate of isocyanuric acid represented by the general formula

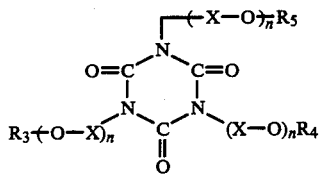

(II-3)

wherein X's, $R_3$, $R_4$ and n are as defined above, and
$R_5$ represents an acrylol or methacryloyl group, and 2-hydroxyethyl acrylate, 2-hydroxypropyl acrylate or a mixture thereof, as a hydroxyl group-containing radical-polymerizable compound.

6. The composition of claim 2 wherein the polyisocyanate compound is selected from the group consisting of 2,4-tolylene diisocyanate, 2,6-tolylene diisocyanate, 1,4-xylylene diisocyanate, diphenylmethane 4,4-diisocyanate, 3-methyldiphenylmethane diisocyanate, isophorone diisocyanate, hexamethylene diisocyanate, dicyclohexylmethane 4,4'-diisocyanate, dicyclohexylmethane 2,4'-diisocyanate, lysine diisocyanate, hydrogenated xylylene diisocyanate, hydrogenated diphenylmethane 4,4'-diisocyanate, polyisocyanates obtained by polymerizing divalent or trivalent polyisocyanate compounds, and isocyanate-terminated urethane prepolymers obtained by reacting at least one of the aforementioned polyisocyanate compounds with a polyol compound having at least two hydroxy groups per molecule, and a number average molecular weight of 62 to 20,000, the equivalent ratio of the hydroxyl groups of the polyol compound to the isocyanate groups of the polyisocyanate compound being 1:1.2–3.

7. The composition of claim 3 wherein the polyisocyanate compound is selected from the group consisting of 2,4-tolylene diisocyanate, 2,6-tolylene diisocyanate, 1,4-xylylene diisocyanate, diphenylmethane, 4,4-diisocyanate, 3-methyldiphenylmethane diisocyanate, isophorone diisocyanate, hexamethylene diisocyanate, dicyclohexylmethane 4,4'-diisocyanate, dicyclohexylmethane 2,4'-diisocyanate, lysine diisocyanate, hydrogenated xylylene diisocyanate, hydrogenated diphenylmethane 4,4'-diisocyanate, polyisocyanates obtained by polymerizing divalent or trivalent polyisocyanate compounds, and isocyanate-terminated urethane prepolymers obtained by reacting at least one of the aforementioned polyisocyanate compounds with a polyol compound having at least two hydroxy groups per molecule, and a number average molecular weight of 62 to 20,000, the equivalent ratio of the hydroxyl groups of the polyol compound to the isocyanate groups of the polyisocyanate compound being 1:1.2–3.

8. The composition of claim 4 wherein the polyisocyanate compound is selected from the group consisting of 2,4-tolylene diisocyanate, 2,6-tolylene diisocyanate, 1,4-xyylene diisocyanate, diphenylmethane 4,4- diisocyanate, 3-methyldiphenylmethane diisocyanate, isophorone diisocyanate, hexamethylene diisocyanate, dicyclohexylmethane 4,4'-diisocyanate, dicyclohexylmethane 2,4'-diisocyanate, lysine diisocyanate, hydrogenated xylylene diisocyanate, hydrogenated diphenylmethane 4,4'-diisocyanate, polyisocyanates obtained by polymerizing divalent or trivalent polyisocyanate compounds, and isocyanate-terminated urethane prepolymers obtained by reacting at least one of the aforementioned polyisocyanate compounds with a polyol compound having at least two hydroxy groups per molecule, and a number average molecular weight of 62 to 20,000, the equivalent ratio of the hydroxyl groups of the polyol compound to the isocyanate groups of the polyisocyanate compound being 1:1.2–3.

9. The composition of claim 5 wherein the polyisocyanate compound is selected from the group consisting of 2,4-tolylene diisocyanate, 2,6-tolylene diisocyanate, 1,4-xylene diisocyanate, diphenylmethane 4,4-diisocyanate, 3-methyldiphenylmethane diisocyanate, isophorone diisocyanate, hexamethylene diisocyanate, dicyclohexylmethane 4,4'-diisocyanate, dicyclohexylmethane 2,4'-diisocyanate, lysine diisocyanate, hydrogenated xylylene diisocyanate, hydrogenated diphenylmethane 4,4'-diisocyanate, polyisocyanates obtained by polymerizing divalent or trivalent polyisocyanate compounds, and isocyanate-terminated urethane prepolymers obtained by reacting at leasst one of the aforementioned polyisocyanate compounds with a polyol compound having at least two hydroxy groups per molecule, and a number average molecular weight of 62 to 20,000, the equivalent ratio of the hydroxyl groups of the polyol compound to the isocyanate groups of the polyisocyanate compound being 1:1.2–3.

10. The composition of claim 2 useful for forming protective coatings and further comprising at least one additional component other than the isocyanuric ring-containing urethane-modified radical-polymerizable compound and selected from one or more of the following: film-forming prepolymers having at least two radical-polymerizable double bonds per molecule, reactive diluents, photopolymerization initiators, photopolymerization promoters, thermally decomposible catalyst components, pigments, fillers, adhesion promoters, flow improvers, non-radical polymerizable modifying resins, polymerization inhibitors, ultraviolet absorbers, antistatic agents, dyeability imparting agents, solvents and mixtures thereof.

11. The composition of claim 3 useful for forming protective coatings and further comprising at least one additional component other than the isocyanuric ring-containing urethane-modified radical-polymerizable compound and selected from one or more of the following: film-forming prepolymers having at least two radical-polymerizable double bonds per molecule, reactive diluents, photopolymerization initiators, photopolymerization promoters, thermally decomposible catalyst components, pigments, fillers, adhesion promoters, flow improvers, non-radical polymerizable modifying resins, polymerization inhibitors, ultraviolet absorbers, antistatic agents, dyeability imparting agents, solvents and mixtures thereof.

12. The composition of claim 4 useful for forming protective coatings and further comprising at least one additional component other than the isocyanuric ring-containing urethane-modified radical-polymerizable compound and selected from one or more of the following: film-forming prepolymers having at least two radical-polymerizable double bonds per molecule, reactive diluents, photopolymerization initiators, photopolymerization promoters, thermally decomposible catalyst components, pigments, fillers, adhesion promoters, flow improvers, non-radical polymerizable modifying resins, polymerization inhibitors, ultraviolet absorbers, antistatic agents, dyeability imparting agents, solvents and mixtures thereof.

13. The composition of claim 5 useful for forming protective coatings and further comprising at least one additional component other than the isocyanuric ring-containing urethane-modified radical-polymerizable compound and selected from one or more of the following: film-forming prepolymers having at least two radical-polymerizable double bonds per molecule, reactive diluents, photopolymerization initiators, photopolymerization promoters, thermally decomposible catalyst components, pigments, fillers, adhesion promoters, flow improvers, non-radical polymerizable modifying resins, polymerization inhibitors, ultraviolet absorbers, antistatic agents, dyeability imparting agents, solvents and mixtures thereof.

* * * * *

UNITED STATES PATENT AND TRADEMARK OFFICE
CERTIFICATE OF CORRECTION

PATENT NO. : 4,855,334
DATED : August 8, 1989
INVENTOR(S) : OSAMU MARUYAMA ET AL.

It is certified that error appears in the above-identified patent and that said Letters Patent is hereby corrected as shown below:

Claim 1, line 2 of the claim, "uretahen" should read
--urethane--.

Claim 1, line 36 of the claim, "hydroxxyethylacrylate" should read --hydroxyethylacrylate--.

Claim 3, line 16 of the claim, "acrylol" should read
--acryloyl--.

Claim 8, line 4 of the claim, "1,4-xyylene" should read
--1,4-xylylene--.

Claim 9, line 4 of the claim, "1,4-xylene" should read
--1,4-xylylene--.

Signed and Sealed this

Fifth Day of June, 1990

Attest:

HARRY F. MANBECK, JR.

*Attesting Officer*         *Commissioner of Patents and Trademarks*